R. BROWN.
HEADLAMP FOR AUTOMOBILES.
APPLICATION FILED DEC. 15, 1920.

1,430,433.

Patented Sept. 26, 1922.

INVENTOR
R. Brown by
ATTY.

Patented Sept. 26, 1922.

1,430,433

UNITED STATES PATENT OFFICE.

ROBERT BROWN, OF CALGARY, ALBERTA, CANADA.

HEADLAMP FOR AUTOMOBILES.

Application filed December 15, 1920. Serial No. 431,029.

*To all whom it may concern:*

Be it known that I, ROBERT BROWN, a subject of the King of Great Britain and Ireland, residing at 1407 2nd Street W., Calgary, in the Province of Alberta, Canada, have invented certain new and useful Improvements in Headlamps for Automobiles, of which the following is a specification.

This invention relates to headlamps for automobiles and to that type designed to avoid the transmision of such rays of light as have a dazzling effect. In connection with such anti-dazzle lamps it has already been proposed to provide an internal rearwardly reflecting surface covering substantially the upper half of the front glass in order that the rays of light normally reaching the upper half of the front glass may be again reflected on to the back reflector and ultimately caused to pass out through the lower half; and it has further been proposed with a view to concentrating such rays to make the said rearwardly reflecting surface curved. In such constructions, however, some of the light is undoubtedly lost through repeated or perpetual internal reflection.

The object of the invention is to provide an improved arrangement of reflecting surfaces whereby rays of light falling on the rearwardly reflecting surface will be reflected back through the focus of the rear reflector and thus emerge in lines parallel to the axis of this rear reflector.

According to the invention therefore, the upper internal rearwardly reflecting surface used in conjunction with a paraboloid back reflector is paraboloidal in form and is so arranged that its axis is coincident with the axis of the paraboloid mirror and its focus coincident with the focus of the said mirror and situated at the point where the source of light is situated.

The rearwardly reflecting surface may either be formed on the glass front of the lamp or upon a separate metal reflector.

In the accompanying drawings illustrative of the invention,

Figure 1:
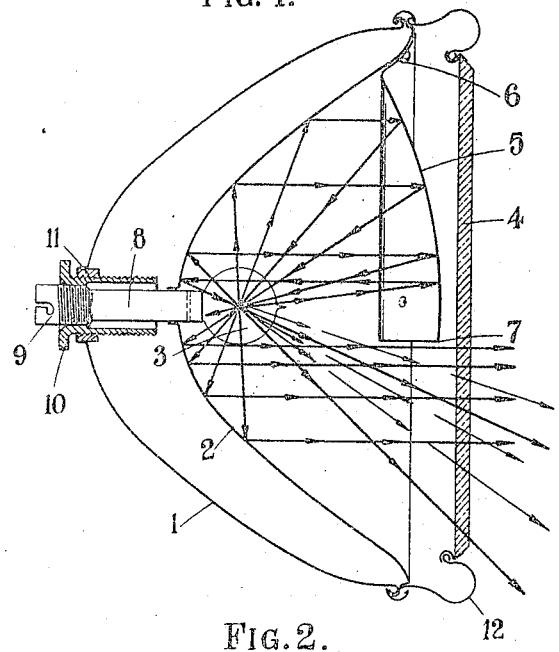
Fig. 1 represents a vertical section through a headlamp constructed in accordance with my invention.

The bulb 3 of an electric lamp is placed so that its centre of illumination coincides with the focus of the paraboloidal back reflector 2 which takes the form of a metal stamping or spinning.

A backwardly directing sheet metal reflector 5 obscuring the upper half of the glass 4 is secured by fastening devices 6 such as screws to the outer portion of the back reflector 2. The front glass 4 is secured to the front member 12 of the lamp.

The surface of the metal reflector 5 forms part of a paraboloid of revolution the focus of which coincides with the focus of the rear paraboloid 2; it will be seen that rays striking the reflector 5 either directly or by reflection from the reflector 2 will be reflected back through the common focus and will ultimately emerge through the lower portion of the lamp in a direction parallel to the common axis of the paraboloids.

Figure 2:
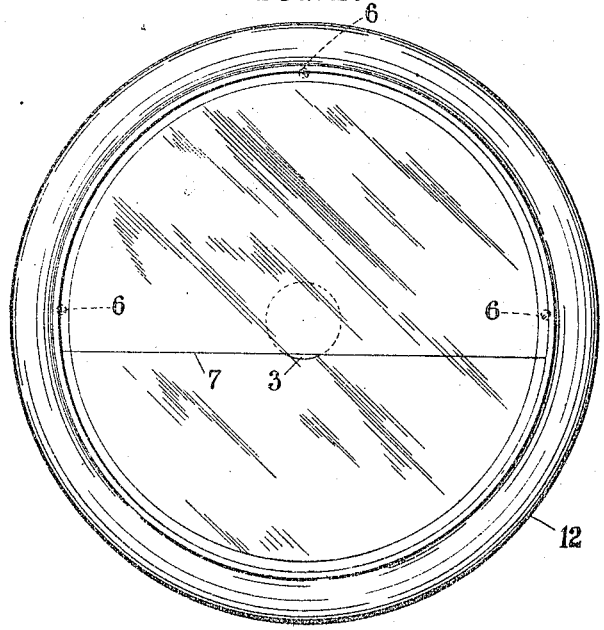
Fig. 2 represents a front elevation of the headlamp.

The lower edge 7 of the reflector 5 may either be straight as shown in Fig. 2 or may have a curved form.

The bulb is mounted in a holder 8 provided with a bayonet connection 9 which is screwed in an adjusting sleeve 10. This sleeve is adjustable in a nut 11 secured in the back casing 1 of the lamp.

What I claim is:—

1. The combination in an automobile head light of a casing, a light source, a light reflecting means, a front glass for the casing, said light reflecting means comprising a rear parabolic reflecting surface, and a front segmental parabolic reflecting surface extending to or slightly below the axis of the head light, the reflecting surfaces having a common focal point but different focal lengths, the source of light being located at the common focal point.

2. An automobile head lamp, comprising a parabolic rear reflecting surface of short focus, the edge of said reflecting surface extending forward of the focus, a parabolic reflecting surface of segmental shape located in front of the top portion of said rear reflecting surface and extending to or slightly below the axis of the headlamp, the focus of the front and rear surfaces being coincident, and the segmental parabolic reflecting surface joining the rear reflecting surface, and a source of light positioned at the common focal point of the two reflecting surfaces, whereby all the rays of light projected by the upper half of the rear reflecting surface are reflected by the segmental reflecting surface through the source of light to the lower half of said rear reflecting surface which subsequently reflects said light rays outwardly in substantially horizontal parallel rays for reinforcing the rays of light from the source normally projected by said rear reflector.

In testimony whereof I affix my signature.

ROBERT BROWN.